G. R. MATHESON & J. B. SHAW.
AUTOMOBILE HEADLIGHT.
APPLICATION FILED APR. 27, 1915.

1,209,987.

Patented Dec. 26, 1916.
2 SHEETS—SHEET 1.

WITNESS
Roland Foster

INVENTORS
G. R. Matheson
J. B. Shaw
By Fred B. Fairweather, Attorney

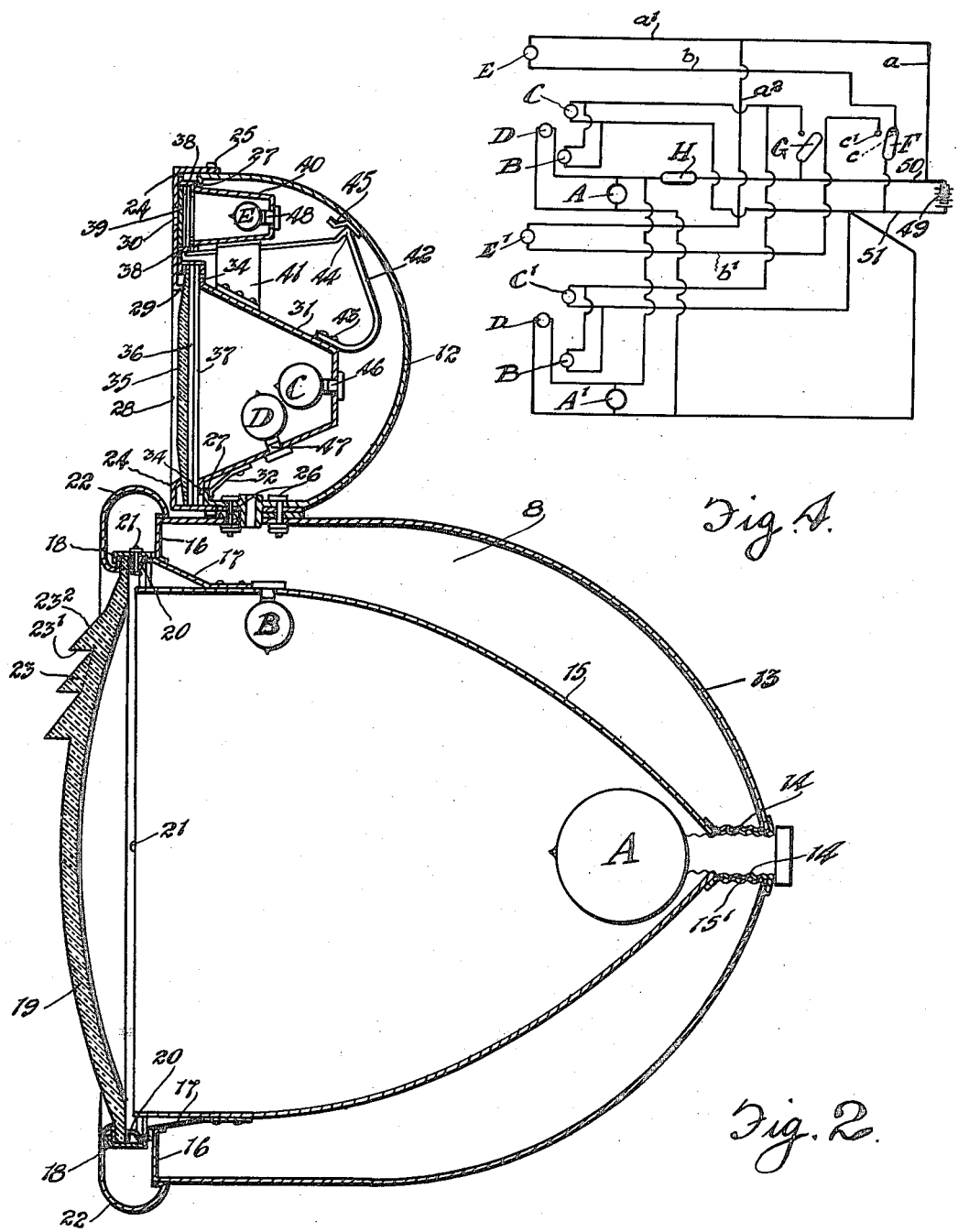

UNITED STATES PATENT OFFICE.

GILBERT ROBERT MATHESON AND JOSEPH BERTRAM SHAW, OF WINNIPEG, MANITOBA, CANADA.

AUTOMOBILE-HEADLIGHT.

1,209,987.  Specification of Letters Patent.  Patented Dec. 26, 1916.

Application filed April 27, 1915. Serial No. 24,304.

*To all whom it may concern:*

Be it known that we, GILBERT ROBERT MATHESON and JOSEPH BERTRAM SHAW, both of the city of Winnipeg, in the Province of Manitoba, Canada, have invented certain new and useful Improvements in Automobile-Headlights, of which the following is the specification.

The invention relates to improvements in automobile headlights and the principal object of the invention is to provide a combination headlight equipped with a number of lamps and proper lighting circuits which can be used both for signaling and illuminating purposes, the lighting circuits, at all times, being directly under the control of the car attendant.

A further object of the invention is to construct a combination headlight in an inexpensive manner and in a way such that the parts can be readily removed for repair or other purposes.

Figure 1:
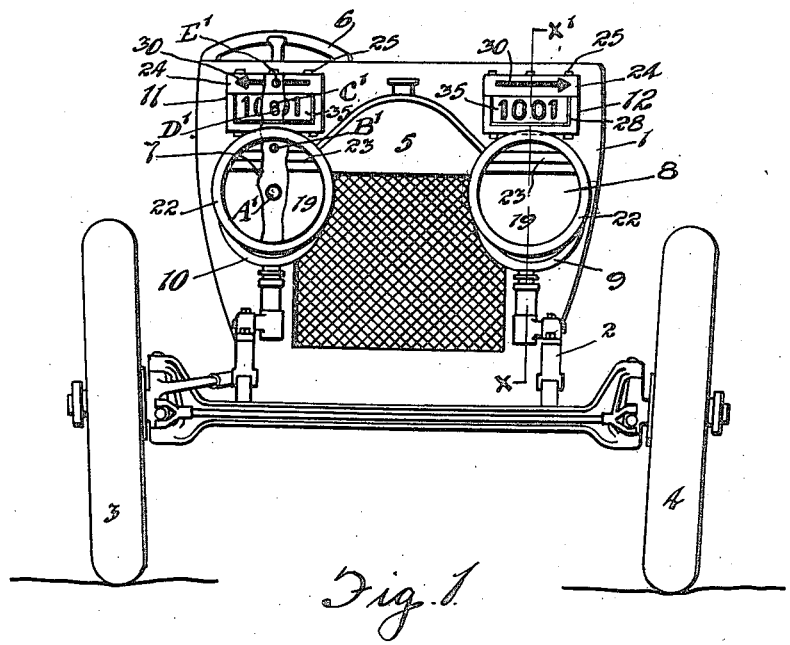
Figure 3:
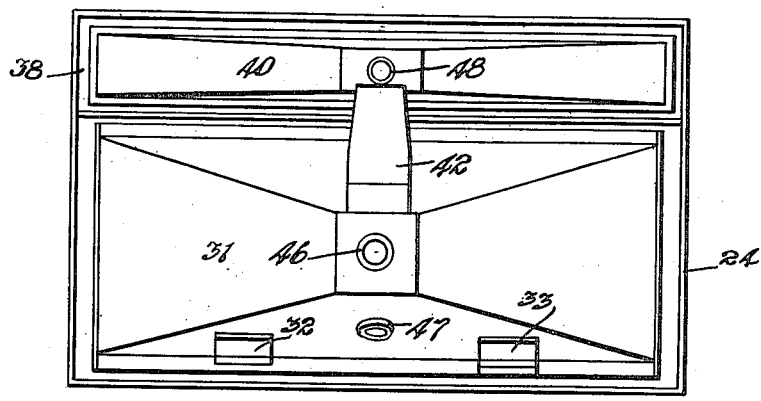

With the above and other objects in view which will become more apparent as the description proceeds, the invention consists essentially in the arrangement and construction of parts hereinafter more particularly described and later pointed out in the appended claim, reference being had to the accompanying drawings in which:

Figure 1 represents a front view of an automobile equipped with our invention. Fig. 2 represents an enlarged detailed vertical sectional view centrally through one of the headlights, the section being taken in the plane denoted by the line X—X' Fig. 1. Fig. 3 represents an enlarged detailed rear view of the interior portions of the top casing. Fig. 4 is a view showing diagrammatically the lighting circuits and the manner in which they are controlled.

In the drawings like characters of reference indicate corresponding parts in each figure.

1 represents an automobile body carried by the chassis 2 which is mounted in the ordinary way on front and rear wheels, the front wheels only being shown in the present drawings and indicated by the reference numerals 3 and 4.

5 represents the ordinary radiator and 6 the steering wheel.

All of the above parts are of customary construction and as they do not form any part of this invention it is not considered necessary to describe them further.

7 and 8 represent automobile headlights carried by supporting brackets 9 and 10 mounted on the chassis. These headlights are identical and are specially constructed as later described. On the headlights we have mounted similar top casings 11 and 12 which contain a special arrangement of lamps and reflectors, the lamps being connected in special lighting circuits. As the two headlights and two casings, with contained parts, are all identical in construction, we will simply describe one of them in detail.

Referring now to Fig. 2 of the drawings, wherein an enlarged detailed vertical sectional view through the right hand light is shown and presently to Fig. 3,—13 represents a main thimble shaped headlight casing, fitted centrally with an inwardly extending permanent screw threaded socket 14 on which we have mounted a short nipple 15' located at the apex of a cone shaped or flaring main reflector 15. This arrangement allows the reflector to be removed by unscrewing the nipple from the socket. The forward edge of the casing is supplied with an inturned flange 16 on which rests a bearing band 17 secured to the reflector, the said bearing band centering the forward or open end of the reflector in the flange.

18 is a ring of channel iron cross section butted against the flange and carrying the lens 19, the lens being held in position by a filling ring 20 fastened by suitable bolts 21 to the ring 18.

22 is a finishing ring carrying the ring 18 and is itself fastened to the main casing. This finishing ring forms in reality a door frame which is held to the main casing by removable side pins 22'. This arrangement is such that when the finishing ring or door is opened, the lens is carried with it and exposes the open end of the reflector. The reflector can then be removed by unscrewing the nipple from the socket.

The upper portion of the lens is specially constructed to provide a plurality of parallel, overhanging portions 23 of a saw tooth cross section, presenting horizontal portions 23' and inclined portions $23^2$. The horizontal portions 23' are transparent, as is also the body of the lens, while the inclined portions 23² are frosted. The object of this arrangement will be later apparent.

"A" is an illuminating lamp screw threaded into the socket 14 and located at the apex of the reflector and "B" is a signaling lamp located at the top of the well to the front of the reflector and carried by a suitable socket mounted in the reflector. Each of the casings 11 and 12 which are in reality auxiliary casings, are more or less semi-circular in cross section and appear rectangular in front view, being closed at the front by a closure plate 24 fastened by removable bolts 25 to the casing. The auxiliary casings are fastened permanently to the top sides of the main casings by bolts 26. Each auxiliary casing is fitted, forwardly, with an inturned flange 27 and the closure plates 24 have the lower portions thereof for the greater part open as indicated at 28, the opening being bounded by a flange 29 while the upper portions thereof are closed, save for the exception of a longitudinally disposed signaling slot 30 having the outline of an arrow. At this point we wish it to be noticed that the arrow outline for the closure plate of the casing 12 points to the right while that for the closure plate of the casing 11 points to the left.

31 is an auxiliary reflector located in the lower portion of the auxiliary casing, which reflector carries on the underside a pair of spring clips 32 and 33 and is fitted at the front or open end with an out-turned flange 34. It is here to be noticed that the flange 27 is caught between the flange 34 and the spring clips 32 and 33 when installed.

35 is a lens located in the opening 28 and bearing against the flange 29.

36 is an opaque number plate located immediately to the rear of the lens and having numbers appearing thereon, the numbers being formed by cutting away portions of the plate to outline the numbers. In the present instance the number so formed in the plate is 1001, this number in reality being the license number of the automobile. Immediately to the rear of the plate 36 is a further transparent plate 37 formed from ground glass. This latter plate butts against the front face of the flange 34. 38 is an open frame contained within the upper portion of the closure plate and bearing on the upper edge of the lens 35 and adjacent plates. This frame contains a transparent ground glass plate 39 which is located immediately to the rear of the slot 30.

40 is a top deflector located in the upper portion of the auxiliary casing immediately to the rear of the frame 38 and supported from the deflector 31 by means of a bracket 41 carried by said deflector.

42 is a flat spring having one end permanently secured at 43 to the deflector 31 and the opposite end extending beneath the bracket and engaging with the lower side of the frame 38. The said spring is bent to provide a catch 44 which is designed to engage with a stop 45 secured to the interior of the auxiliary casing.

From the above arrangement it will be seen that one can remove both the deflectors 31 and 40 very readily once the closure plate 24 has been taken off. As soon as this plate is removed, the lens 35 and plates 36 and 37 can be taken out and afterward the bottom deflector can be withdrawn by springing up the lower portion of it to release the spring catches 32 and 33 from behind the flange 27. As soon as the deflector is removed the top deflector can be pulled out.

The deflector 31 is supplied with a centrally located lamp socket 46 fitted with an illuminating lamp C and immediately adjoining the light C is a further signal light D carried also by a socket 47 mounted in the said deflector.

The top deflector 40 is supplied with a centrally located socket 48 in which we have mounted a signal light E.

We might here remark that in order to properly describe the lighting circuits, the lamps in the one headlight are indicated by the reference letters A, B, C, D and E while the lamps in the other headlight are indicated by the reference letters A', B', C', D' and E'.

In connection with the lamps, we desire, when installing, that the lamps A A' be both white lights, those B B' be red and green respectively, those C C' be both white lights, those D D' be red and green respectively and those E E' be red and green respectively. These colors, red and green have been chosen as they are generally used for signaling purposes.

Referring now particularly to Fig. 4 of the drawings, we will now describe the lighting circuits. 49 represents a source of electromotive force and 50 and 51 positive and negative main wires leading from the source. A lead wire "a" connects with the positive line wire 50 and branches into two lead wires a' and a² which connect with the positive sides of the lamp E E'. Return wires b b' connect with the negative sides of the lamps E E' and lead to independent contact tips c c'. F indicates a switch connected with the negative main wire and arranged, when swung, to contact with either one or other of the contact tips c c'. The lamps C B and C' and B' are paralleled across suitable feed wires connected with the mains, and the circuits containing these lamps are controlled by a single switch G. The lamps A D and A' D' are paralleled across suitable feed wires leading from the mains and they are arranged such that the circuits containing the lamps are controlled by a single switch H. In actual practice the wires will be grouped together, where possible, and contained in suitable conduits and the switches controlling the several circuits will be located within convenient range of the automobile driver when sitting in the seat.

We will now describe the manner in which the lights are manipulated when the automobile is in use.

When the car is running, the switch H is closed and that G is open with the result that the lamps A A' as well as those D D' are illuminated and the lamps B B' and those C C' are out. The result of this is that a strong illuminating light is thrown on the roadway for the driver by the lamps A A' while the license number appears illuminated in colors, red and green, at opposite sides of the car. This illuminated license number is a great advantage to an approaching automobile driver as he knows, by reason of the colors, which side of the car to pass on. When the car is standing still, that is, at the curb or roadside, the switch H is opened to throw off the lamps A A' and D D' and the switch G is closed to light the lamps C B and C' B'. The result of this is that a white light is thrown onto the roadway by the lamps C C' sufficient for illuminating purposes while red and green lights are shown at opposite sides of the car through the lenses 19. This is desirable as will be readily appreciated. In this connection it is to be noted that while the lights C C' illuminate, they still show the license number in a white light.

The lamps E E' are only used for signaling purposes in order that the driver of the car can indicate to another party in what direction he wishes to make a turn. If he wishes to turn to the right, the switch F is moved to close the circuit containing the light E' with the result that a red arrow appears at the top of the right hand headlight. The party signaled then knows definitely which way the approaching car is going to turn. On the other hand, if it is desired to turn to the left, the switch F is turned to illuminate the light E' and thereby expose a green arrow at the top of the headlight at the left hand side of the car.

While we have chosen certain colors of lights and certain arrangements of plates, we wish it to be understood that these may be modified as required without in the least departing from the spirit of our invention.

It is now explained that the enlargements 23 are constructed in the special manner hereinbefore described in order that the light rays will be deflected by the upper part of the lens to the ground in advance of the car when the lamps A A' are on and those B B' off and so that the light rays emanating from the colored lamps B B' will be diffused when the lamps B B' are on and those A A' are off.

What we claim as our invention is:—

The combination with an automobile headlight, of a casing mounted on the top of the headlight, a removable closure plate closing the front side of the casing and having the lower portion thereof for the greater part open and the upper portion thereof for the greater part closed save for the exception of a signaling slot, a removable auxiliary deflector contained within the casing and located to the rear of the opening in the lower portion of the plate, a lens inserted in the latter opening and closing the front side of the auxiliary deflector; a number plate located to the rear of the lens, a removable top deflector contained within the casing, mounted on the auxiliary deflector and located to the rear of the upper slotted portion of the closure plate and illuminating lights contained within the auxiliary and top deflectors.

Signed at Winnipeg this 29 day of January, 1915.

GILBERT ROBERT MATHESON.
JOSEPH BERTRAM SHAW.

In the presence of—
G. S. ROXBURGH,
ROLAND FOSTER.